United States Patent [19]
Bauer et al.

[11] 4,127,741
[45] Nov. 28, 1978

[54] ARRANGEMENT FOR ELASTICALLY CLAMPING GLASS FIBRE RODS

[75] Inventors: Ewald Bauer, Wunsiedel; Martin Kreuzer, Mittelweissenbach, both of Germany

[73] Assignee: Rosenthal Technik AG, Germany

[21] Appl. No.: 783,393

[22] Filed: Mar. 31, 1977

[30] Foreign Application Priority Data

Mar. 31, 1976 [DE] Fed. Rep. of Germany ....... 2613682

[51] Int. Cl.² .......................... H01B 17/38; F16B 4/00
[52] U.S. Cl. ................................ 174/189; 174/140 S; 174/179; 174/186; 174/192; 403/268; 403/361; 403/368; 403/369
[58] Field of Search ..................... 174/140 S, 176, 177, 174/178, 179, 186, 188–192; 403/202, 203, 268, 269, 300, 314, 333, 334, 361, 365, 366, 367, 368, 369, 371, 372

[56] References Cited

U.S. PATENT DOCUMENTS

3,698,749  10/1972  Yonkers ........................... 403/368 X

FOREIGN PATENT DOCUMENTS

1,030,414  5/1958  Fed. Rep. of Germany ........... 174/178
1,921,299  11/1970  Fed. Rep. of Germany ........... 174/179

*Primary Examiner*—Laramie E. Askin

[57] ABSTRACT

For fixing metal sheaths on glass fiber reinforced plastic rods, which rods are used, for example, in composite insulators: the sheath is in a number of sections in a longitudinal array; there is an abutment inside the sheath at each sheath section, there is a shoulder piece on the outside of the rod inside each sheath section; the abutment in a sheath section is at one longitudinal side of the respective shoulder piece in that sheath section; elastic and compliant buffer means, such as springs, or the like, are placed between the abutment and its shoulder piece; the compliance of the buffer means increases toward one end of the arrangement to compensate for the different rates of expansion of the sheath and the rod; other embodiments all have appropriate buffer means in each sheath section, which buffer means increase in compliance moving toward the end of the sheath through which the rod exits.

21 Claims, 15 Drawing Figures

ARRANGEMENT FOR ELASTICALLY CLAMPING GLASS FIBRE RODS

BACKGROUND OF THE INVENTION

The invention relates to fixing of sheaths on glass fibre reinforced plastic rods, particularly where the glass fibre rod constitutes the load bearing core of a composite electric insulator. This invention relates to metal sheaths and also relates to sheaths of any other materials besides metal, so long as the coefficient of expansion of the sheath material differs from that of the glass fibre rod.

A problem arises from application of force by metal sheaths or mountings into glass fibre rods. Because of the generally unidirectional fibre reinforcement of such a rod, both its strength and its elastic and plastic deformability in the longitudinal direction and in the transverse direction are markedly different. Glass fibre reinforced plastic rods also differ from the metal or other materials used in their sheathing in other significant properties.

Various affixation methods are known for obtaining pull proof connections between sheaths or mountings and the ends of glass fibre rods. Thus, German Laid-open Patent Specification (DAS) 1,261,358 and Patent of Addition 1,400,003 describe a method of producing a connection between a metal sheath and a plain rod or tube of plastic material, wherein as the sheath is pressed onto a glass fibre rod, the specific pressing forces decrease from the end of the rod toward the point of its emergence from the sheath. Because of the markedly different elastic elongation and the markedly different elasticity limits of the glass fibre rod and the sheath materials, clamping or gripping lengths equal to six times the diameter of the glass fibre rod are necessary in order to make thorough use of the strength of the rod. With high stresses, relative motion between the highly elastic rod and the sheath cannot, however, be avoided.

Another method for affixing of metal sheaths on glass fibre rods is described in German Laid-Open Pending Patent Application (DOS) 1,921,229. It comprises deforming the ends of the plastic impregnated glass fibre rod and the surrounding parts of the sheath in an undulating fashion. A cap is cemented on the end of the insulator. That end of the insulator is split and is given a conical shape by a wedge. However, the connection of the insulator is disturbed by the cleaving operation and the cleaving impairs its mechanical strength. Moreover, the glass fibre rod may be enclosed at its ends by a bush having a central opening that tapers conically toward the centre of the insulator, and an external thread. To connect the glass fibre rod with this bush, the end of the glass fibre rod that is engaged in the bush is fanned out by driving a conical pin into it, so that the glass fibre rod is applied against the wall of the conical opening of the bush.

Finally, it is also known to provide the sheath with at least one inner and outer adhering surface and to force the glass fibre rod against it by means of an external clamping element. With such compression or clamped joints, disadvantages occur under unfavorable circumstances in that as a result of subsequent shrinkage of the plastic or by reason of the different coefficients of thermal expansion of the metal sheath and the plastic rod, the insulator becomes detached from the sheath.

In all of the above prior arrangements, the tensile strength of the glass fibre rod cannot be fully employed. Fundamentally, all of these wedge shaped and conical connections between the sheath and the plastic rod permit only a very limited utilization of the strength of the rod, since with such rigid connections, only the foremost section of the sheathing is able to transmit forces. Those sections of the sheathing which are located further toward the end of the rod are largely relieved of load by the different elastic properties of the glass fibre rod. Furthermore, all of these forms have the inherent disadvantage that the comparatively highly elastic glass fibre rod is connected directly to the rigid material of the sheath.

SUMMARY OF THE INVENTION

The present invention seeks to achieve a substantially uniformly distributed introduction of force from the sheath of metal or other material into the glass fibre rod. Moreover, a suitable accommodation of the thermal expansion between the sheath material having one coefficient of expansion and the glass fibre rod having another coefficient of expansion is to be produced, so that the reliability of the affixation of the sheath to the glass fibre rod is improved. Also, a high anchoring force with greater continuous tensile strength is obtained.

According to the invention, the sheath is comprised of a plurality of longitudinally arrayed sheath sections. The glass fibre rod is connected elastically to the sheath at at least two of the sheath sections. The compliance of the elastic connection of each of the sheath sections increases steadily from the end of the rod to the point where the glass fibre rod emerges from the sheath, so that the compliance corresponds locally in each sheath section to the elastic elongation of the glass fibre rod in consequence of the mechanical load. The elastic connection is achieved by interposing elastic, compliant buffer members, or by ensuring parts of the sheath and the rod have a high elastic deformation or by providing a compliant material of appropriately varying compliance between the sheath and the rod. The increase in the compliance from the end of the rod to the point where the glass fibre rod emerges from the sheath is obtained by means of increasing the thickness of the individual buffer members and/or by changing the material of the buffer members or of the sheath or by changing the compliance of the elements that join the rod and the sheath in each sheath section. Consequently, the elongation of the glass fibre rod can increase substantially linearly within the sheath from the end of the rod to the point of emergence. The sheath and rod are compensated at each point of force transmission.

The sheath material is selected to have thermal expansion that is substantially adapted to that of the glass fibre rod and the buffer means and the clamping action thereby remains fully operative over a wide temperature range of −50° to +100° C.

The above described and other features of the invention will be described hereinafter with reference to the drawings.

BRIEF DESCRIPTION OF THE DRAWINGS

FIG. 8b is a plan view of the arrangement shown in FIG. 8a;

DETAILED DESCRIPTION OF THE PREFERRED EMBODIMENTS

In all of the embodiments of the invention, the transmission of force of motion of the glass fibre rod is transmitted to a plurality of sheath sections A, B, C, D, etc. which are arranged in a longitudinally arrayed series on the glass fibre rod 1. The individual sheathing sections respectively transmit approximately the same proportion of the total force from the sheath to the glass fibre rod.

Figure 1:
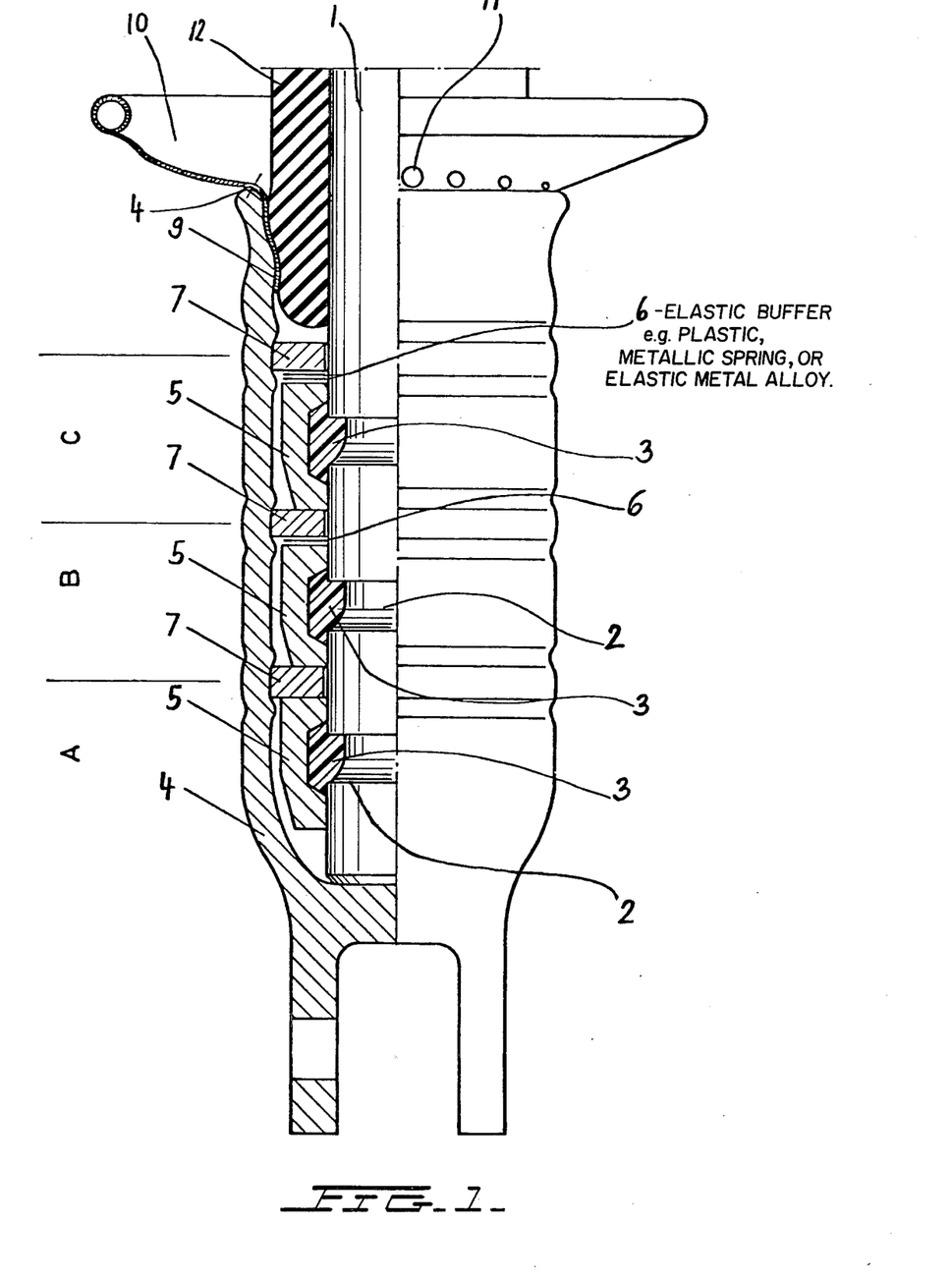
FIG. 1 is a side, partially cross-sectional view of a first embodiment of the invention.

In the first embodiment of FIG. 1, encircling grooves 2 are formed, for example, by being ground into the glass fibre rod 1. In the individual sheath sections A, B, C, etc., that proportion of the total tension in the glass fibre rod 1 which applies to each sheathing section is transmitted to that section. A cement material 3 located in and around grooves 2 and comprised, for example, of synthetic resin, holds a shoulder piece 5 stationary with respect to rod 1 yet movable with respect to the tubular sheath 4 which is around and spaced from rod 1. There is an abutment piece 7 which is fixedly connected to the sheath 4 in each section A–C, yet which is slidable along the glass fibre rod 1. Connection of the abutment pieces 7 with the sheath 4 is achieved by press fitting the abutment pieces 7 into sheath 4 by plastic deformation of the sheath 4. The shoulder piece and abutment piece in each section are longitudinally spaced apart a distance related to the degree of shifting of rod 1 with respect to sheath 4 in a relative expansion of rod 1. In most sheath sections between the shoulder piece 5 and the respective abutment piece 7, there is an interposed elastic buffer member 6. Suitable elements for the buffer members 6 comprise plastics with a variable modulus of elasticity, metallic spring elements and elastic metal alloys.

According to the embodiment of FIG. 1, both the spaces between shoulder pieces 5 and their respective abutment pieces 7 and the elastic deformability of the buffer members 6 in the individual sheath sections A, B, C, etc., increase toward the point of emergence of the rod 1 from the sheath, 4, i.e., upwardly in FIG. 1. At the same time, the buffer member 6 can be dispensed with in the sheath section A (near the bottom of FIG. 1) and the space between the pieces 5 and 7 in that sheath section A can be minimized because of the slight elongation of the rod 1 at this end.

At the upper end of the sheath 4, there is a control funnel 10 which is inserted in the sheath. The funnel 10 includes a connecting tube 9 which is initially likewise of cylindrical form and is pressed onto the end of the umbrella shell 12 inside of and together with the sheath 4, whereby satisfactory sealing against the penetration of moisture is obtained. The control funnel 10 is provided with an annular array of holes 11 near the base of the funnel, so that no water may be able to collect in it. The umbrella shell 12 is comprised of a material, for example silicone rubber, which is so elastic that it does not impede the relative movement between the glass fibre rod 1 and the sheath 4, as this motion may amount to several millimeters.

Figure 2:
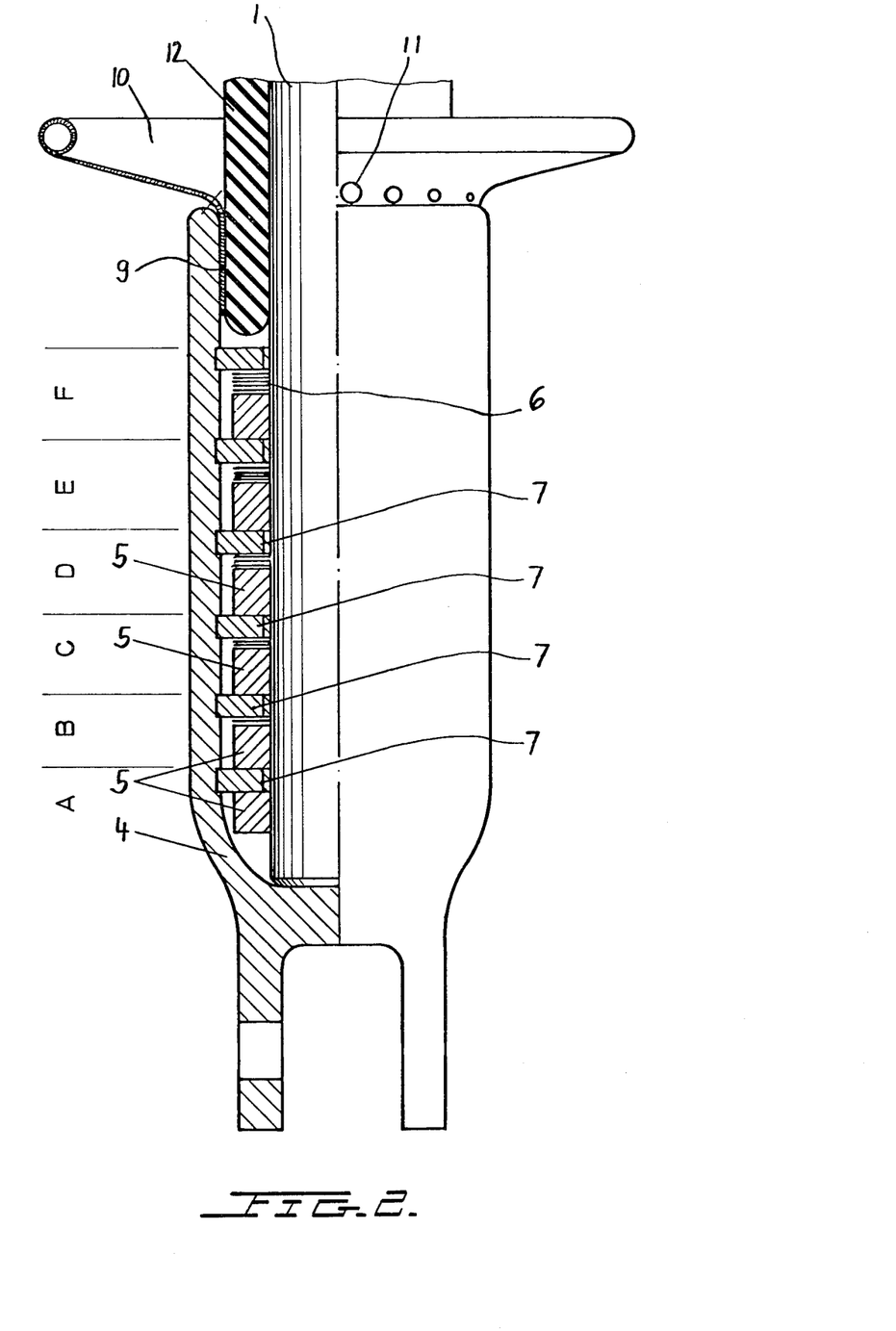
FIG. 2 is a side, partially cross-sectional view of a second embodiment of the invention.

The embodiment of FIG. 2 is similar to that of FIG. 1, but with the difference that the cross-section of the glass fibre rod 1 is not reduced by annular grooves. The full strength of rod 1 is now utilized. Moreover, the shoulder pieces 5, which are movable with respect to the sheath 4, are pressed, shrunk or cast rigidly onto the glass fibre rod 1. The abutment pieces 7, which are movable with respect to the rod 1, and the buffer members 6 between pieces 5 and 7 may be made in the form of split rings, so that they may be mounted directly before their introduction into the sheath 4.

Figure 3:
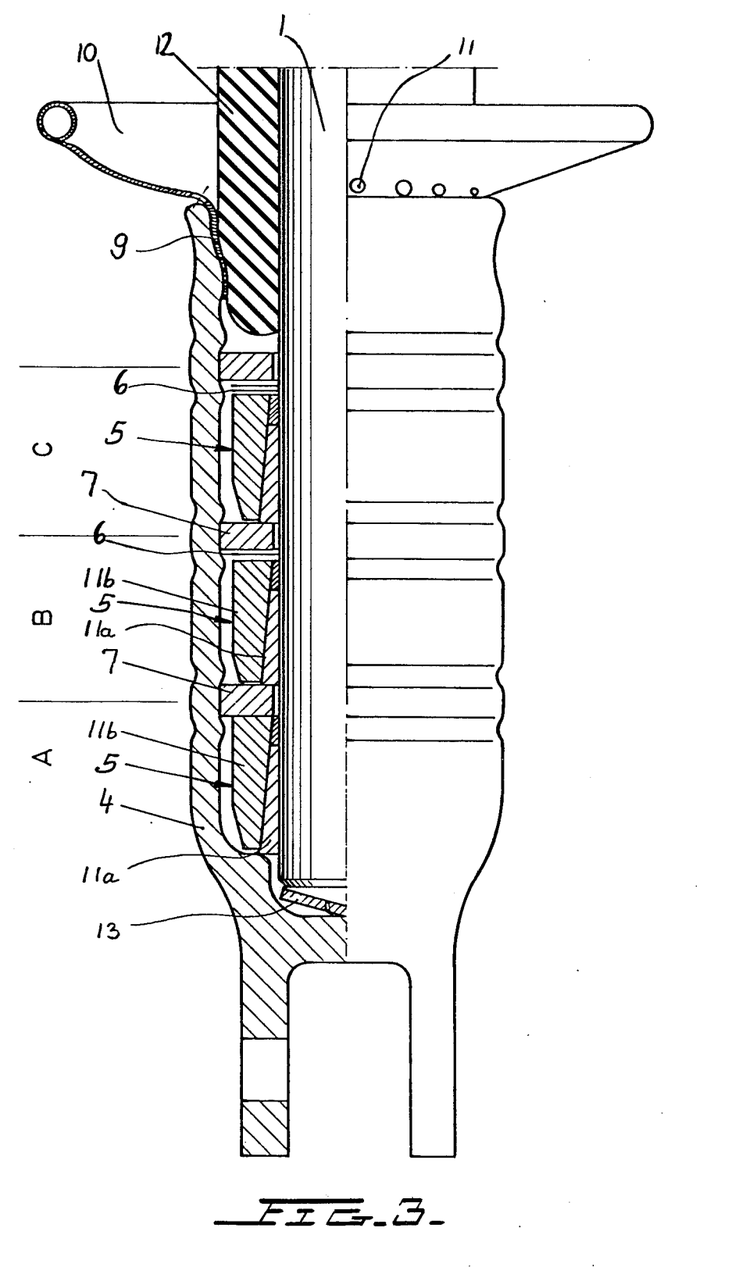
FIG. 3 is a side, partially cross-sectional view of a third embodiment of the invention.

In the embodiment of FIG. 3, the full cross-section of the glass fibre rod 1 is likewise utilized. This embodiment makes it simple to assemble. To this end, the shoulder piece 5 is not cemented onto the glass fibre rod. It is instead held on the rod 1 through friction. The shoulder piece 5 is a two part clamping sleeve 11a and 11b with the conical outer surface of inner sleeve 11a and the mating conical inner surface of outer sleeve 11b both having a very shallow cone angle in the range of about 0.5° to 10°. The inner sleeve tapers narrower toward the top end of the rod 1. The inner clamping sleeve 11a presses in against rod 1 and is feathered in order to achieve a uniform distribution of the pressure force on the rod, while the clamping sleeve 11b is preferably of solid form. The shoulder piece 5 is comprised of a metallic material, preferably with a modulus of elasticity 400,000 N/mm². It is pressed against the glass fibre rod 1 with a force which increases as the tension of the glass fibre rod 1 increases.

So that the connection of the rod and the sheath caused by the shoulder pieces 5 cannot become loose on removal of the load on the rod, a spring 13, preferably a cup spring, is inserted between the lower, captured end of the glass fibre rod 1 and the closed end of the sheath 4. The spring 13 is depressed by the glass fibre rod 1. If the depression of the spring 13 is effected by means of a threaded pin screwed through the bottom of the sheath, a releasable connection can be created if the cone angle of the parts 11a and 11b is suitably designed.

In this and at least some of the other embodiments, the abutment pieces 7 may be fitted into the sheath 4 not by pressing on, but instead by being screwed into the sheath 4 with the abutment pieces and the sheath being provided with corresponding respective engaging external and internal threads.

Figure 4:
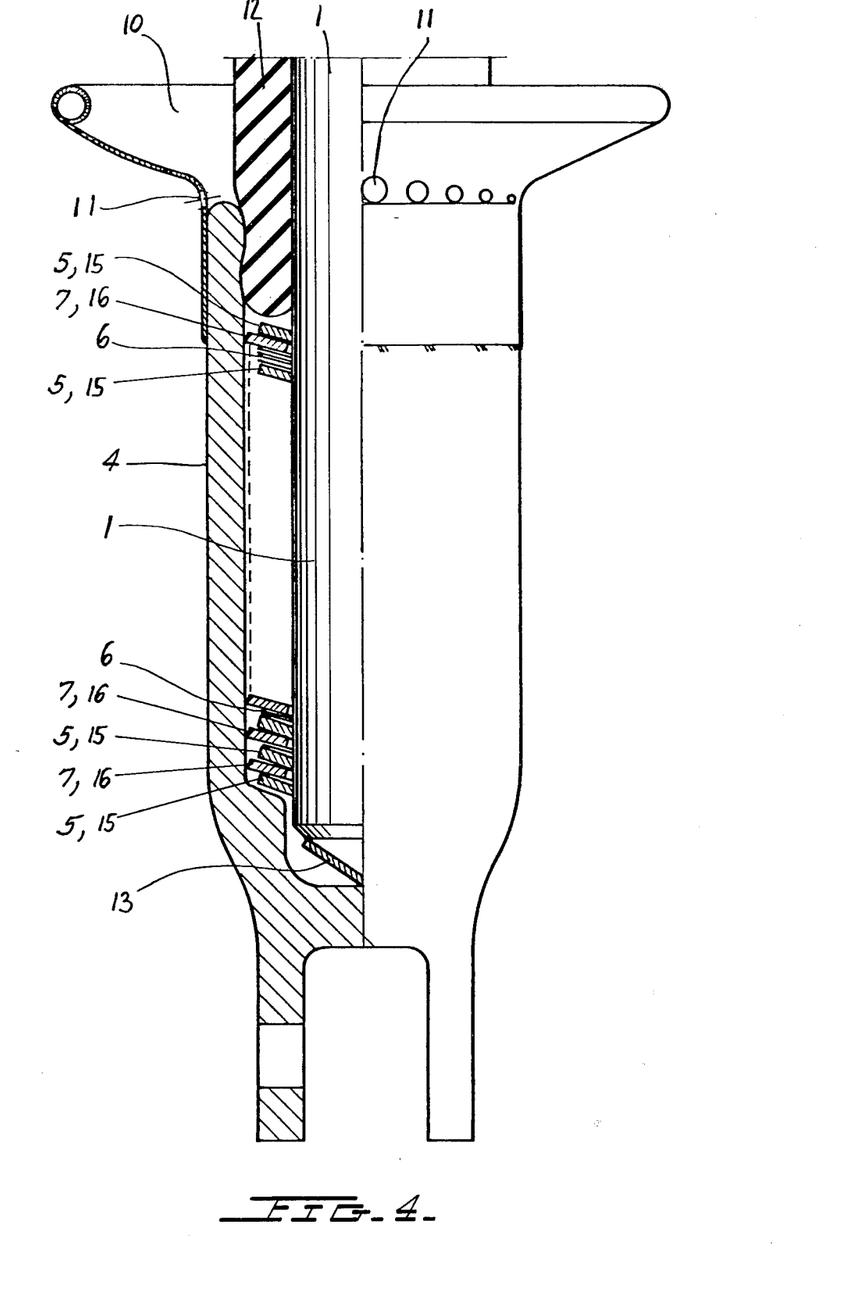
FIG. 4 is a side, partially cross-sectional view of a fourth embodiment of the invention.
Figure 5A:
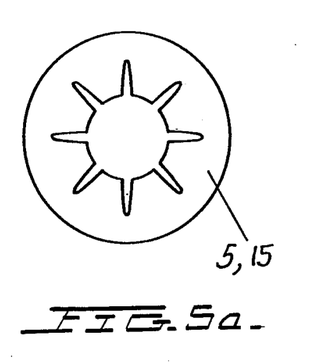
FIG. 5a is a plan view of one of the force transmission discs used in the fourth embodiment and also in other embodiments.
Figure 5B:
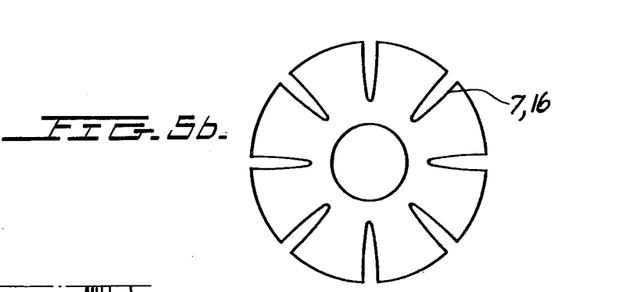
FIG. 5b is a plan view of another of these discs.

In the fourth embodiment of FIG. 4, the glass fibre rod 1, is provided with a chamfer at its bottom end. The rod 1 is pushed into the sheath 4 until the cup spring 13 on the bottom of the sheath is deformed. On removal of the load on the rod 1, self locking of the rod occurs and the rod 1 can no longer be moved back or up in FIG. 4. For this purpose, in FIG. 4, the shoulder pieces 5, which are movable with respect to the sheath, are in the form of unidirectionally self locking, internally feathered, toothed discs 15, and the abutment pieces 7, which are fixed with respect to the sheath but are movable with respect to the glass fibre rod 1, are in the form of externally feathered, self locking, toothed discs 16. Moreover, exact matching of the toothed discs to one another is important.

Figure 6A:
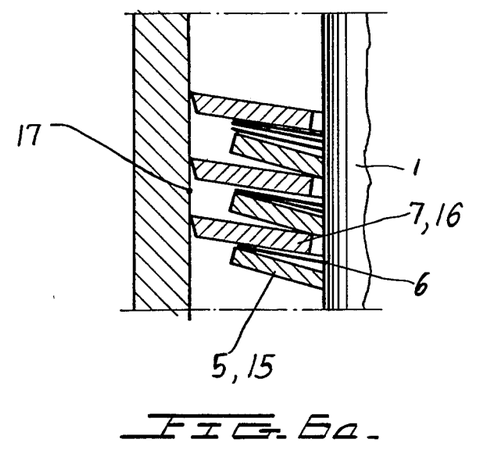
FIG. 6a is an enlarged fragment of the fourth embodiment showing one version thereof.
Figure 6B:
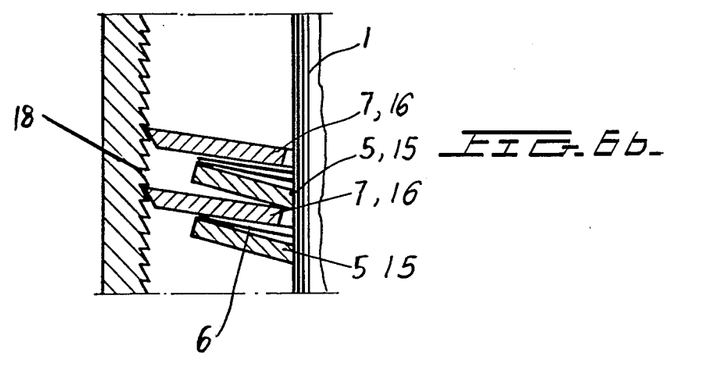
FIG. 6b is the same type of view as FIG. 6a showing another version of the fourth embodiment.

Full details of the discs 15, 16 are apparent from FIGS. 5a, 5b, 6a and 6b. The externally toothed discs 16 brace themselves with respect to the internal bore of the sheath 4 either through friction against the plain internal bore 17 (FIG. 6a) or positively by means of a rigid, one way motion toothing 18 on the inner face of the sheath 4 (FIG. 6b). The toothing only permits descent of discs 16. The solution according to FIG. 6a has the advantage in comparison with that of FIG. 6b that it can be optimized, an equalization of load being obtained by slipping of some of the toothed discs 15 in the event of local overloading of the sheath and in consequence of inaccuracies of assembly. So that the stack consisting of the toothed discs 15, buffer members 6 and toothed discs 16 may be compressed as far as the outermost abutment piece on assembly, it is useful to employ one or more additional internally feathered, self locking, toothed discs 15.

Returning to FIGS. 6a and 6b, the buffer members 6 are positioned between the toothed discs 5, 15 and the abutment pieces 7, 16 to provide elongation compensation between the rod and the sheath. Intermediate pieces, in particular toothed discs 15, buffer members 6 and abutment pieces 7 may follow directly on one another in each case in this sequence. It is more suitable, however, with a view to a simplified design, especially of the buffer members 6, for a plurality of intermediate pieces to be stacked directly on one another from time to time, then to have a suitably dimensioned buffer member 6 follow and, finally, a larger number of abutment pieces 7.

Figure 7:
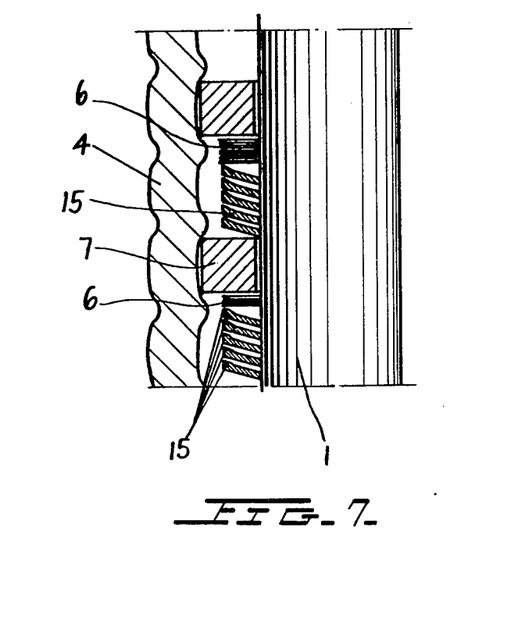
FIG. 7 is a side partially cross-sectional view of a fragment of a fifth embodiment of the invention.

In the fifth embodiment shown in FIG. 7, the plurality of abutment pieces 7 are replaced by a single solid abutment piece onto which the sheath 4 is pressed. Satisfactory operation is obtained through the correct matching both of the springiness and of the spreading properties of the toothed discs 15 and the abutment pieces 7. Great importance also attaches to the correct choice of the angle of inclination of the toothed discs 15.

Figure 9:
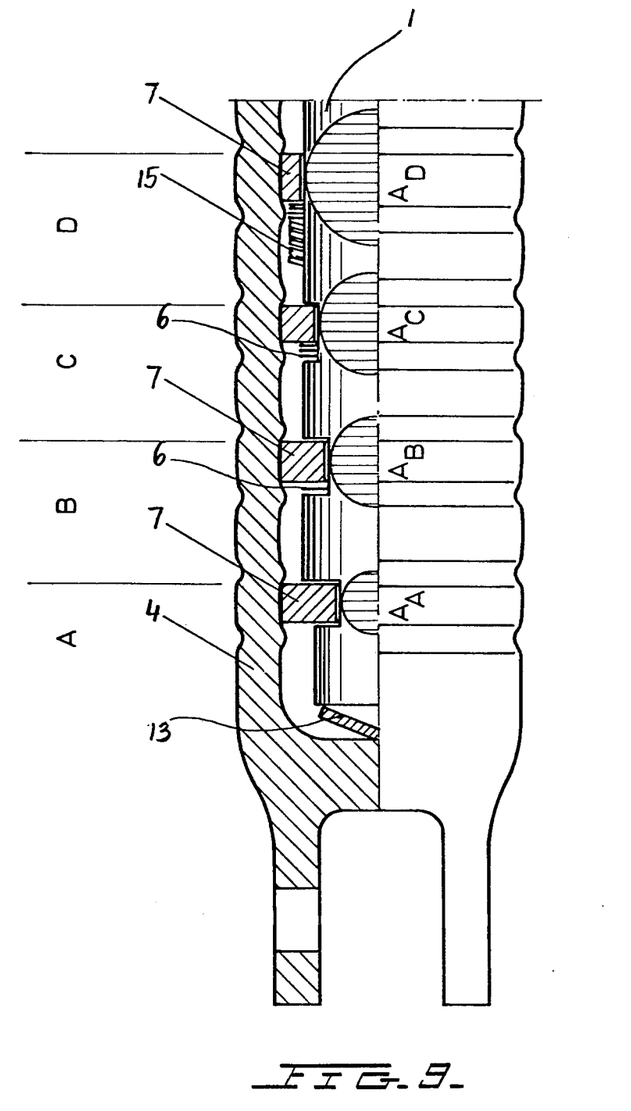
FIG. 9 is a side, partially cross-sectional view of a sixth embodiment of the invention.

FIG. 9 shows a sixth embodiment of the invention. If it is desired to utilize the maximum gripping or retaining force, i.e., clamping with the minimum length is required, it is advantageous to introduce the partial forces in accordance with the sheath sections A, B, C not into the full rod cross-section $A_D$, but only into the partial cross-sections corresponding to the partial forces. To this end, the rod is so stepped that the differences in cross-section from sheath section to sheath section are in proportion to the forces absorbed by the sheath sections. With a uniform distribution of the total force of the glass fibre rod 1 over the sheath sections, this means that the cross-sections of the rod vary by equal steps at the individual sheath sections. As in other embodiments, buffer pieces 6 compensate for the stresses between the rod and the sheath. In the embodiment of FIG. 9, the introduction of force for the sheath section $A_D$ is solved in accordance with the embodiment of FIG. 7. As shown, abutment piece 7 is press fit in sheath 4.

Figure 10:
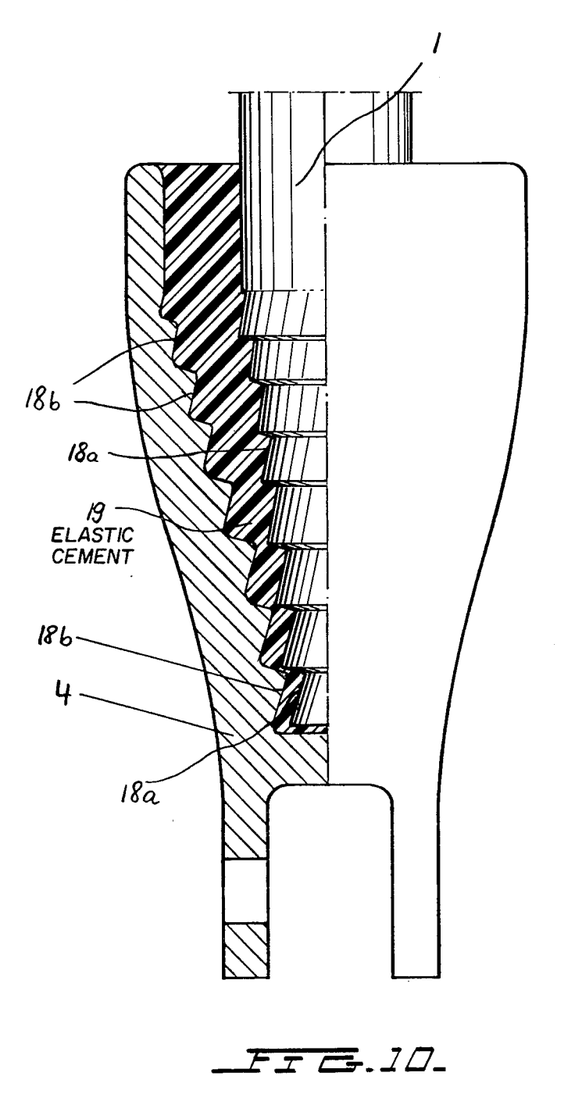
FIG. 10 is a side, partially cross-sectional view of a seventh embodiment of the invention.

FIG. 10 shows a seventh embodiment of the invention. The shoulder pieces 5 and the abutment pieces 7 do not appear. The function of the shoulder pieces 5 on the rod 1 is performed by the conical surfaces 18a ground into the rod. The function of the abutment pieces 7 on sheath 4 is performed by the internal conical surfaces 18b formed in the bore of the sheath 4. The buffer means are all formed by one mass of an elastic cement material 19. The increasing compliance of the buffer means from the lower end of the rod 1 to the point where the glass fibre rod 1 emerges from the sheath is achieved by means of suitably adapting the thickness of the elastic cement material 19. In contrast to the embodiments of FIGS. 1 to 9, the buffer means 19 is subjected in this case not only to pressure stresses, but also to shearing stresses.

Figure 11:
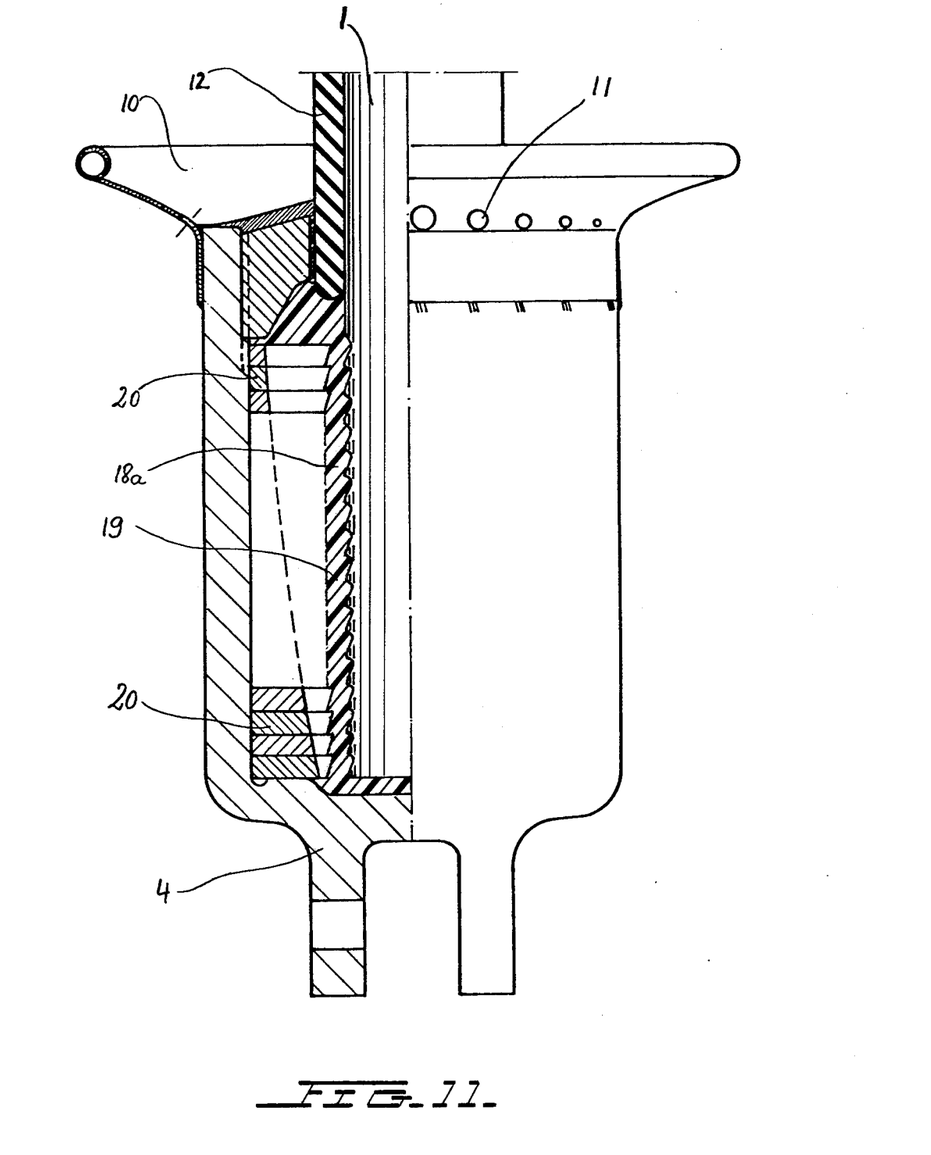
FIG. 11 is a side, partially cross-sectional view of an eighth embodiment of the invention.

In the eighth embodiment of FIG. 11, elastic suspension of the glass fibre rod 1 in the sheath 4 is achieved through the individual spring elements 20 being elastically deformable. To this end, individual spring elements 20 are let into the sheath and are so constructed that they increase in their compliance from the end of the rod to the point where the glass fibre rod 1 emerges from the sheath 4. The glass fibre rod 1 is either united with the spring elements 20 via a layer of cement or it is screwed directly into the stack of spring elements. In such case, an external thread must be ground on the rod 1 and the stack of spring elements 20 must have a corresponding internal thread.

Figure 12:
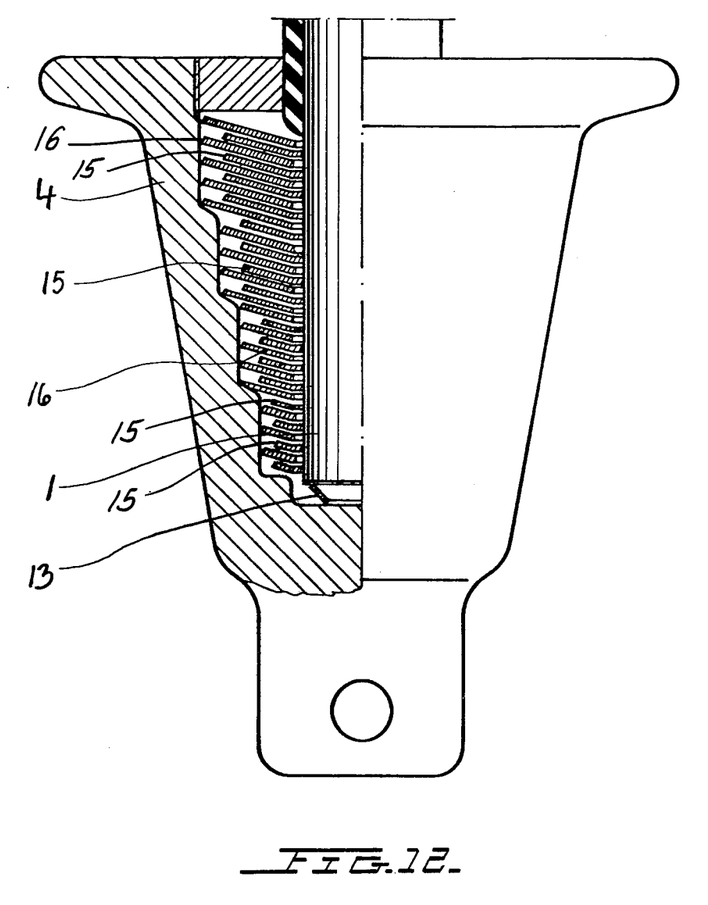
FIG. 12 is a side, partially cross-sectional view of a ninth embodiment of the invention.

In the embodiment of FIG. 12, separate buffer members are absent. Because of this, the entire block of shoulder pieces 15 and/or abutment pieces 16 must be elastic. In this case, the internally toothed discs 15 (as in FIG. 5a) must be made larger toward the end of the assembly from which the glass fibre rod 1 emerges. In practice, it may also be imagined that the shoulder 5 and/or abutment pieces 7 are combined to form one piece and are deformable in themselves.

Figure 8A:
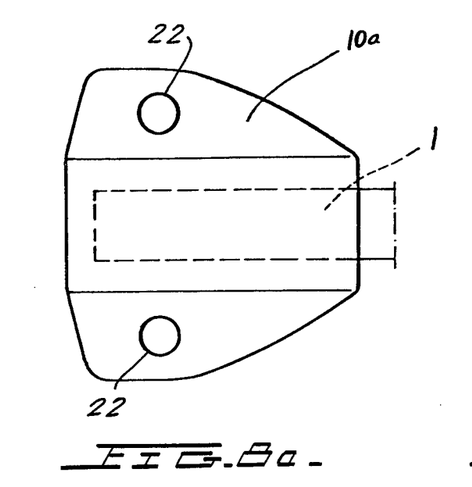
FIG. 8a is a side elevational view of the upper end of an embodiment of fibre rod used with various embodiments of the invention.
Figure 8B:
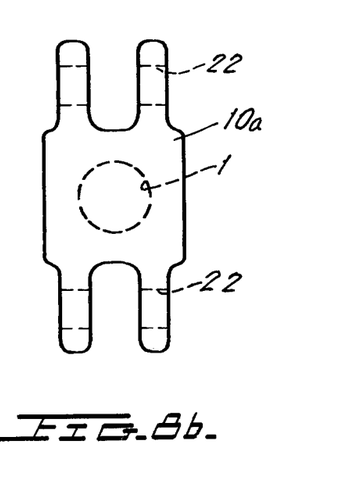

To complete the description, reference is also made to FIGS. 8a and 8b. Here, in contrast to the other examples, the suspension fork 10a is used in place of the funnel 10 at the end of rod 1. Fork 10a is arranged with its bores 22 at the sides of the sheath 4. In this way, a smaller overall length of the insulator can be achieved. This solution can always be used when the sheath 4 is not pressed onto the abutment pieces 7, but, for example, is instead screwed on or holds by friction at the inner face of the sheath.

The advantages of the various embodiments have already been described. In contrast to press on sheaths and conical connections, optimum values are obtained concerning the holding power and the long term tensile strength. This can be attributed to the fact that the increasing elastic deformation of the glass fibre rod toward its end that emerges from the sheath is compensated by increasing compliance of the buffer members. Moreover, the design measures according to the invention ensure a reliable positive or frictional connection over the entire length of the sheath with the use of simple means. Moreover, the advantages of conical and pressure connections are combined with one another by simple means. In addition, the mechanical strength of the insulator is considerably increased by the arrangement.

Although the present invention has been described in connection with a plurality of embodiments thereof, many variations and modifications will now become apparent to those skilled in the art. It is preferred, therefore, that the present invention be limited not by the specific disclosure herein, but only by the appended claims.

What is claimed is:

1. An arrangement for fixing a sheath comprised of a material of one coefficient of expansion on a glass fibre reinforced plastic rod of a different coefficient of expansion, said arrangement comprising:

said rod being elongated and extending in a direction; said sheath surrounding said rod; said sheath having an internal bore; said sheath being comprised of a plurality of sections arranged in series longitudinally along said sheath;

first buffer means support means inside each said section of said sheath;

respective second buffer means support means on said rod and spaced from the respective said first buffer means support means;

elastic and compliant buffer means between each said first buffer means support means and the respective said second buffer means support means; moving in said direction along said rod, each said buffer means having the characteristic that its compliance is greater than the compliance of the neighboring said buffer means back along said rod, with the compliances of said buffer means being selected to correspond locally to the elongation of said rod with respect to said sheath during changes in operating conditions to which said arrangement is subjected.

2. The arrangement for fixing a sheath on a rod of claim 1, wherein said sheath has an end through which said rod emerges; said rod elongates with respect to said sheath in said direction and emerges through said sheath end as said rod elongates.

3. The arrangement for fixing a sheath on a rod of claim 1, wherein said sheath is metal.

4. The arrangement for fixing a sheath on a rod of claim 1, wherein said first buffer means support means and the respective said second buffer means support means are in opposition inside said sheath such that the compression of the respective said buffer means changes as said rod elongates with respect to said sheath.

5. The arrangement for fixing a sheath on a rod of claim 4, wherein said buffer means is between said first and said second buffer means support means and said first and said second buffer means support means are so placed that said buffer means is between them and is compressed as said rod elongates.

6. The arrangement for fixing a sheath on a rod of claim 5, wherein said first buffer means support means comprises an abutment inside of and held stationary on said sheath, and said second buffer means support means comprises a shoulder piece outside of and held stationary on said rod.

7. The arrangement for fixing a sheath on a rod of claim 6, wherein a respective encircling groove is defined in said rod at each said shoulder piece and said shoulder piece is secured to said rod at said groove.

8. The arrangement for fixing a sheath on a rod of claim 6, wherein said abutment is affixed to said sheath.

9. The arrangement for fixing a sheath on a rod of claim 6, wherein said shoulder piece is affixed to said rod.

10. The arrangement for fixing a sheath on a rod of claim 6, wherein said shoulder piece comprises a self locking disc around said rod, said disc having a feathered opening therein through which said rod passes for gripping said rod.

11. The arrangement for fixing a sheath on a rod of claim 6, wherein said abutment comprises a self locking disc inside said sheath and having a feathered periphery, which engages said bore of said sheath and grips said sheath.

12. The arrangement for fixing a sheath on a rod of claim 11, wherein said shoulder piece comprises a self locking disc around said rod, said disc having a feathered opening therein through which said rod passes for gripping said rod.

13. The arrangement for fixing a sheath on a rod of claim 6, wherein said shoulder piece comprises an inner sleeve; said inner sleeve having an interior bore therethrough around said rod; said inner sleeve interior bore being longitudinally feathered along said direction of elongation of said rod, said inner sleeve having an exterior surface, conically tapered, with said conical taper thereof narrowing in said direction of elongation of said rod; said shoulder piece further comprising an outer conical clamping sleeve having an interior conically tapered bore with a conical taper that mates with said exterior surface of said inner clamping sleeve; said outer sleeve being clamped down over said inner sleeve so that the respective conical tapers clamp said inner sleeve against said rod.

14. The arrangement for fixing a sheath on a rod of claim 13, wherein said sheath has a closed end from which said rod elongates; a spring in said sheath at said closed end biasing said rod to move in said direction.

15. The arrangement for fixing a sheath on a rod of claim 6, wherein said shoulder pieces and said abutments are so placed in each said section that moving in said one direction along said rod, the space between said shoulder means and its respective said abutment increases; said buffer means in each said section extending between its said shoulder piece and its said abutment.

16. An arrangement for fixing a sheath comprised of a material of one coefficient of expansion on a glass fibre reinforced plastic rod of a different coefficient of expansion, said arrangement comprising:

said rod being elongated and extending in a direction; said sheath surrounding said rod; said sheath being comprised of a plurality of sections arranged in series longitudinally along said sheath;

elastic and compliant buffer means located inside each said sheath section and joining said sheath at each said section with said rod at each said section; said buffer means in each said section having the characteristic that the elastic compliance thereof is less than the elastic compliance of the said buffer means inside the neighboring said sheath section moving in said direction of elongation of said rod, with the compliances of said buffer means in each said section being selected to correspond locally to the elongation of said rod with respect to said sheath in that said sheath section during changes in operating conditions to which said arrangement is subjected.

17. The arrangement for fixing a sheath on a rod of claim 16, wherein said buffer means comprises a body of elastic material interposed between and generally filling the space between said sheath and said rod.

18. The arrangement for fixing a sheath on a rod of claim 17, wherein said sheath has an interior bore; said bore of said sheath and the exterior of said rod are so profiled and shaped that the radial space between said sheath and said rod increases in each said section of said sheath in said direction of elongation of said rod, whereby a greater radial width of said buffer means material is present in each said section in the direction of elongation. of said rod, thereby increasing the elastic compliance of said buffer means along said direction.

19. The arrangement for fixing a sheath on a rod of claim 16, further comprising in each said sheath section, at least one abutment inside of and held stationary on said sheath and a respective shoulder piece outside of and held stationary on said rod; said abutment piece and the respective said shoulder piece together comprising said buffer means; said shoulder piece being separated from and being engageable with its respective said abutment upon elongation of said rod in said direction; said abutments and said shoulder pieces having the characteristic that in each said section of said sheath moving along the direction of elongation of said rod, the compliance of the combination of said abutment and said shoulder piece increases, thereby to increase the compliance of said buffer means moving along the direction of elongation of said rod.

20. The arrangement for fixing a sheath on a rod of claim 19, wherein in each said section of said sheath moving along said rod in said direction, said interior bore of said sheath and the exterior of said rod are respectively so profiled that the radial distance between the interior of said sheath and the exterior of said rod increases, moving along said rod in said direction; the radial widths of the respective said shoulder pieces and said abutments in said sheath sections correspondingly increase with the radial distances between said sheath bore and said rod of the respective said sections of said sheath, thereby increasing the compliance of said buffer means in the sections moving along said rod in said one direction.

21. The arrangement for fixing a sheath on a rod of claim 16, wherein said buffer means comprises a plurality of spring means, with a said spring means in each said sheath section and said spring means joining and extending between said rod and said sheath in each said section of said sheath; moving in said direction, said spring means in said sheath sections having the characteristic that their respective said compliance increases.

* * * * *